United States Patent Office 2,715,582
Patented Aug. 16, 1955

2,715,582

PROCEDURE FOR TREATING PRODUCTS TO PREVENT DETERIORATION

Henry C. Marks, Glen Ridge, and Frede B. Strandskov, Clifton, N. J., assignors to Wallace & Tiernan Company, Inc., a corporation of New Jersey No Drawing. Application February 15, 1950, Serial No. 144,384

14 Claims. (Cl. 99—154)

The protection of fruit, particularly citrus fruit, as well as vegetables and the like, against decay caused by organisms such as fungi, has been a major problem of the fruit-growing and allied industries. More specifically many natural articles of which some examples are lemons, oranges, grapefruit, and melons, and likewise various vegetables such as onions, tomatoes and potatoes, are found to be highly susceptible to decay or other deterioration arising from growth of micro-organisms, notably fungi, on the surface of the product whenever any extended period of time must elapse after original harvesting and before eventual use, e. g. periods of time required in storage, handling or shipment.

The problem is peculiarly acute in the case of citrus fruit; for example, after picking and washing, lemons are often kept in storage for periods up to six months, so that they will be available in an acceptable state (i. e. the partially ripened state demanded by the market) at various times other than those of the usual harvest. Furthermore, lemons, organes and grapefruit, as well as a number of other fruits and vegetables, are commonly shipped for long distances from the places where they are grown to localities of sale and use, for instance from the fruit-growing regions of California, Texas and Florida, to markets of the northern or northeastern parts of the United States. In spite of refrigeration, fairly large losses of these natural, grown products have been encountered during both storage and shipment, a principal cause being so-called fungus decay. Unfortunately, the products must ordinarily be kept in an atmosphere of relatively high humidity in order to prevent objectionable dehydration, which would result not only in shrinkage in weight but in undesirable appearance and dryness of the products; such high humidity is very favorable to fungus growth and thus tends to promote the decay of the fruit.

Among various treatments heretofore used or proposed to prevent such decay, one effective process has involved the treatment of the fruit, i. e. in a warehouse or the like, with dilute nitrogen trichloride in gaseous form. Applied, say, at least several times a week by permeating the warehouse with the gas for a period of several hours, such treatment has been successful in controlling the growth of fungi, so as to minimize greatly the corresponding decay of various citrus fruits. Careful and critical control, however, must ordinarily be exercised in order to avoid injury to the products by excess of reagent gas, yet at the same time it is difficult to reach remote pieces of the stored fruit without over-exposure of the more accessible pieces. Another difficulty with the process has been the corrosive nature of nitrogen trichloride, in that it tends to attack the structure and equipment of the warehouse in which it is necessarily released, resulting in damage to structural and other parts and fittings, particularly metal elements, pipes and apparatus, the corrosive effect being heightened by the humid atmosphere necessarily maintained in the warehouse for reasons explained above. Other chlorinous gases such as chlorine itself or chlorine dioxide, have been proposed for similar treatment, but event if effective in one way or another, they are likewise strongly corrosive and tend to produce similar damage to the storage house or equipment in it.

An alternative scheme for protection of the products has been to employ paper or similar wrappers impregnated with materials which are of fungicidal character or which release such materials. Still other proposals have been to incorporate fungistatic or fungicidal agents in waxes or the like which are applied as a coating to the fruit. In general, however, the substances employed for treating wrappers or for incorporation in coating materials have always had some tendency to produce unpleasant taste or odor in the fruit, especially when used in quantities that might have a significant effect toward prevention of decay over a long period. So far as is known, moreover, none of these proposals involving treated wrappers or coating waxes has afforded complete protection, or protection of the effective character achieved, for instance, by nitrogen trichloride. On the other hand, gas treatments such as the latter are not only corrosive to surrounding equipment, but are apt to damage the fruit if used in even a slight excess above the concentration needed to prevent decay. The highly reactive nature of nitrogen trichloride or the like also tends to cause such gas to be consumed by the wood of the packing crates and the skin of the outermost pieces of fruit, before it reaches the innermost pieces, it being remembered that a storage room for lemons, for instance, may house a great many wooden crates each containing about 35 dozen lemons. Thus in order to be sure of reaching the innermost pieces of fruit, relatively high concentrations of the reagent gas must be used for long periods of time, with the frequent result that the most easily accessible pieces are overtreated.

While reference has been made above to the treatment of articles in storage houses, it will be understood that treatments involving a gas or other application may be used elsewhere. For instance, it has sometimes been the practice to treat fruit or other produce in a freight car or other vehicle or vessel after the same has been loaded and just before it is moved out of the shipping area toward a distant delivery point. Such operation thus represents another of the many situations to which the present invention is applicable.

It has now been discovered that effectively protective treatment of fruit and other natural, grown products may be achieved by a new and improved process which is essentially safe for the produce (yet easy to use), and which can, if desired, be kept essentially free of corrosive or corrosion-producing character, a particular feature of the process being that it does not introduce any objectionable taste or odor into the fruit. More specifically, such results have been obtained, i. e. in accordance with the present invention, by maintaining on the surface of the fruit a suitable amount of an iodide, and periodically treating the fruit with a non-corrosive gas of oxidizing character. By such operation, an active agent of marked fungicidal or fungistatic nature is produced and in effect kept on the surface of the fruit, to inhibit the growth of the decay-producing organisms, as by destroying them. More specifically, the selected oxidizing gas reacts with the iodide to release free iodine which is therefore present on the fruit in so-called available form, and which exhibits the active properties just mentioned. In destroying the fungus organisms or other organic contamination the iodine is gradually reduced back to the iodide form, but at the next of the described periodic treatments with oxidizing gas, such iodide is again converted to free iodine and is thus re-established in anti-fungus effect, to destroy any organisms which may in the meantime have secured a foothold, so to speak, on the surface of the fruit.

In this fashion, a concentration of active iodine is in effect continuously maintained directly at the surface (e. g. in the skin) of the fruit, and in sufficient amount to inhibit or prevent the growth of the decay-producing organisms. The gas employed, of which examples are ozone and volatile organic peroxides, may be essentially non-corrosive, i. e. may be a substance which does not liberate acid or acid salts in the presence of moisture, so that the difficulties heretofore encountered with gas treatment processes, and specifically the damage to storage houses and other structure or equipment exposed to the gas, are avoided. A particular advantage of the presently preferred operation is that the treating gas itself may be relatively unreactive, e. g. toward organisms and other organic material; the gas alone does not have to control decay, but produces a highly activated condition only upon reaching the site where fungicidal action or the like is desired. Moreover, as distinguished from procedures wherein all destruction of organisms must be accomplished directly by the gas, the present process requires the gas to effect only a relatively rapid reaction of simple chemical sort (i. e. with iodide) which is attainable, throughout the stored crates of produce, by applying a reasonably modest concentration of the gas, such gas being preferably one which is not readily consumed by non-useful reactions on the fruit or adjacent objects.

In a number of cases and notably where the oxidizing gas is a substance such as a volatile organic peroxide, improved results have been obtained by having a metallic catalyst on the surface of the fruit, to promote the reaction between the gas and the iodide. Cobalt, i. e. in combined form, has been found peculiarly effective in catalyzing the liberation of active iodine; although cobalt compounds are now greatly preferred, iron compounds and manganese compounds are also useful catalysts. The metal can be applied to the produce, either as a dilute solution of a salt, or a suspension of an insoluble compound such as the hydroxide, at the outset of operations, and most conveniently by including the metallic salt or other compound in the same solution in which the fruit is dipped to apply the iodide.

After an extended period or course of gas treatments of the character described above, the iodine content of the fruit surface, i. e. the content of iodine atoms (either in iodide or free form) may become reduced, by loss in various ways, to a value where its replenishment is necessary if the treatment is to continue—as may well be required, for example, in the case of lemons or other fruits and vegetables which are stored for long intervals. Such loss of iodine may arise through various causes, usually in combination, examples being loss due to halogenation of organic materials that are inevitably present, and loss because of conversion to iodate, i. e. to the extent (if any) that the selected oxidizing agent may have affected such conversion to appreciable extent in the course of successive treatments.

Accordingly, a further feature of the invention involves re-establishment of the iodine content of the surface of the fruit at the necessary infrequent intervals. While perhaps the most convenient method of originally applying the iodide is to introduce it in the wash or spray with which the fruit is customarily treated just before storage, and while subsequent applications of iodine may be similarly achieved by spraying or washing the fruit, it has been found that the further iodide may be incorporated by a special gas treatment without disturbing the fruit in its place of storage, for example by diffusing around the fruit, in situ, a low dilution of hydrogen iodide. While alternative forms of iodine of volatile or volatilized character may be used, e. g. organic iodides and particularly aliphatic iodides, or even in some cases a very dilute gaseous mixture containing vaporized free iodine, hydroiodic acid is easy and convenient to use, and affords greatly superior results in a number of ways. It has been found that the skin of the fruit very effectively takes up hydrogen iodide from air in which it has been dispersed; the combined iodine which is thus absorbed remains on the fruit surface, presumably in the form of an iodide salt or salts.

Referring in more detail to the process as presently preferred, for instance in the treatment of lemons (corresponding operations being suitable for other fruits and vegetables) the first step is to apply the iodine to the surface of the articles. Although it is possible to introduce the iodine in its elemental state, it is corrosive in large quantities, and difficult and indeed somewhat hazardous to handle, whereas the iodide salts are fully effective yet innocuous and readily applicable in aqueous solution. Thus, for instance, the fruit may be soaked or sprayed with a dilute aqueous solution of iodide such as potassium or sodium iodide, as part of or a sequel to the washing procedure which precedes transfer of the harvested crop to the storage house. As explained above, the solution may also, if desired, contain a small percentage of a metallic compound to serve as catalyst for subsequent, repeated iodine-releasing reactions on the surface of the fruit, e. g. a convenient, soluble salt such as the sulfate or chloride, or alternatively the hydroxide. While for the catalytic effect it appears to make no difference in which state of oxidation the metal occurs, it is more convenient to use the cobaltous, ferrous and manganous compounds. After the treatment with iodide (and catalyst, if used), the articles are disposed in the storage chamber or chambers in the usual manner, the natural spaces between them in stacking or packing, serving to afford access of gaseous reagents in the same manner as heretofore found effective for directly active gases such as nitrogen trichloride.

By the soaking or spraying treatment, a residue of iodide is deposited throughout the surface of each article. Thereafter at frequent intervals the fruit is treated in situ with the oxidizing gas, say two or three 4-hour treatments per week in the case of lemons stored in a humidified, cool warehouse. Under some circumstances more frequent treatments may be found necessary, indeed as many as 5 or 6 per week as now commonly employed with other gases; or alternatively less frequent operation may be required, as experience and observation of the fruit will readily indicate. Among various suitable oxidizing gases of non-corrosive character, ozone and certain peroxide type compounds have been found peculiarly effective and convenient. Ozone readily liberates iodine from iodides and at the same time is quite without corrosive effects on metals or otherwise materials of construction. It is also very conveniently and easily produced, e. g. by suitable ozone generating equipment of known character, at the locality of use. No hazardous chemicals need be handled, nor is the operation otherwise complex or dangerous to attending personnel.

As generated, the ozone is diluted with a large quantity of air and may be released directly in the storage room or chambers, continuing quantities of the gaseous mixture being gradually introduced over the period necessary for effective reaction with the iodide on the surface of the fruit. It will now be understood that the treatment period may range up to several hours but in any given instance will depend on a number of factors, such as the concentration of the reagent gas in the air, the number and size of the pieces of produce to be treated, and the nature and size of the storage room and containers. Whereas in current practice of treating fruit with nitrogen trichloride for its fungicidal effect an average period of 4 hours is required, the gas applications of the present invention may often be of shorter duration, especially with a relatively less reactive gas which can be quickly built up to an effective concentration even at regions deep inside each crate.

In the described application of ozone to iodide-carrying fruit, the ozone reacts with the iodide to release free iodide in effective distribution over the surface of the fruit. The iodine, thus in its so-called available form, is highly active against various organisms, and particularly fungi, which tend to promote or produce decay of the fruit. The moist atmosphere usually found in the storage house is believed to contribute to the effectiveness of the available iodine, by keeping the skin of the fruit somewhat moist; in fact such condition also undoubtedly aids the reaction of the oxidizing gas with the iodide, and probably, too, the occasional deposition of iodide from hydrogen iodide gas.

While the exact reaction occurring between the oxidizing gas (such as ozone) and the iodide on the fruit to release the iodine in available form is difficult to determine, it is believed that the chemical mechanism involves conversion of the iodine to free state, replacing it in combination by hydroxyl or other radical (perhaps with release of oxygen, in the case of ozone); in any event, the effectiveness of result in that the iodine is actually converted to available form by the oxidizing gases, has been abundantly demonstrated under circumstances of the sort here described and even though the reactants may be present in very low concentration on the fruit and in the treating gas, viz, the air dilution of active gas.

To the extent that the presence of water or other medium may be important or desirable to effectuate the reaction between gas and iodide, it appears that the moisture content which invariably characterizes natural grown products is ample for the purpose, or alternatively, even moderate humidity in the ambient air. It is clearly unnecessary to have visible wetness; indeed it may be said that conditions of inherent moisture content or the like which are sufficient for growth of the decay-producing organisms are adequate for like requirements, if any, of the present treatment.

After a certain period of time, usually 24 to 48 hours or so, in which the free iodine has been acting on organisms present, it has usually been re-converted to the iodide form at least in substantial or major part and has thus become essentially inactive. Accordingly the treatment with oxidizing non-corrosive gas is repeated for corresponding re-conversion of iodide to free iodine. Such cycle is continuously reiterated, at whatever intervals may be necessary as explained above, until the losses of iodine (if the fruit is still in storage) require re-establishment of further amounts of the latter. The frequency with which the concentration of iodine (either free or as iodide) on the articles may have to be replenished will depend on the circumstances and requirements of the individual case, for example on the frequency of treatment with the oxidizing agent as well as on surrounding circumstances such as relative humidity, temperature, degree of air circulation and the like. According to present experience, it is believed that replenishment of the iodine, say in the case of lemons in a storage house, may not be required oftener than once every 20 to 30 days. With some oxidizing agents (such as do not produce iodate from iodide) or sometimes with a very large initial deposit of iodide, replacement may be needed only at much longer intervals, or sometimes not at all in a normal storage period of several months.

While the iodine replenishment can be effected by a wash or spray, e. g. with an iodide solution, a gas treatment to like effect is usually preferable, in avoiding any need for removal of the fruit from its position in storage. Indeed any of the described gas treatments may be used for the first iodine application if desired, e. g. when the fruit has already been placed in such locality. Although the iodine can be employed in elemental form to effectuate either the original or a later gas treatment, as by establishing it in a vaporized state, highly diluted with air, and directly diffusing it around the articles so that the skin of the produce takes up the desired small quantities of the element, the low vapor pressure of iodine at ordinary temperatures makes this type of operation considerably less effective than the use of a volatile or gaseous iodide, except in special cases.

A particularly advantageous way of applying iodine, especially to replenish it, is the treatment of the fruit with very low dilutions, in air, of hydrogen iodide, for corresponding absorption of iodide by the skin of the fruit. For instance, by bubbling air through a fairly concentrated aqueous solution of hydrogen iodide, the effluent air contains a low concentration of the acid, which may then in such gaseous form, be applied directly to the fruit. Upon continuing such treatment for a convenient period of time, for example within the range set forth below, a suitable concentration of iodide is found to have accumulated in a desirably distributed state, on the surface of each article. The extent of absorption of iodide from the acid-carrying atmosphere varies to a considerable extent with, and can therefore be controlled by the time of exposure. It will be understood that references to gases or the like herein are intended, unless otherwise stated, to include gaseous dispersions having the full fluidity and permeating qualities of true gases.

It may here be noted that the quantity of iodine that should be applied to the surface of the fruit or other article, either initially or on later replenishing operations, will depend upon the conditions of the individual case, and particularly upon the need for disinfecting, e. g. fungistatic effect on the products under treatment, as well as upon factors that specifically influence such need. By way of example it has been found that for decay prevention in lemons and with regard to the specific circumstances of use, an amount of potassium iodide (or its equivalent otherwise introduced) selected from the range of 1 to 10 mg. (milligrams) per lemon is satisfactory.

After the iodine content on the fruit has been replenished, the periodic treatments with the oxidizing gas are continued as before, and to the same effect of maintaining a suitable free iodine concentration on the lemons or other fruits or vegetables. It will thus be appreciated that so long as the articles remain in storage, the process may be carried on for their protection against decay, simply by the regular applications of oxidizing gas, interspersed at long intervals by the treatments for replenishment of iodine. It will be noted that whereas hydroiodic acid (or free iodine) is a corrosive material, the presently preferred procedure does not offer any serious problem of corrosion as in the case of daily treatment with corrosive gases as heretofore employed. For example, the amount of hydrogen iodide in the treating air can be relatively small, and the frequency of these treatments so low, e. g. only once every few weeks, that any corroding effects are relatively negligible.

Various specific compounds or substances may be alternatively employed in carrying out the procedure, but certain ones are at present preferred. For example, although in applying iodine as a wash or spray, any suitable soluble iodide may be used, the sodium and potassium salts have been found convenient and relatively inexpensive. Likewise, for application of iodide by a gas treatment, a number of substances are available. For instance, while they are usually less effective than hydrogen iodide, organic iodide, i. e. aliphatic iodides, can be used for application or replenishment of iodine content. Particular kinds or classes of compounds that are suitable (e. g. for use in gaseous form) are iodo ethers, iodo ketones, and acyl iodides, viz. compounds where the iodine atom is attached to a carbon atom of an organic radical wherein a neighboring carbon atom has oxygen attached to it. Such compounds liberate iodide rather readily in contact with traces of moisture, i. e. moisture such as is normally present in the surface of the fruit or other produce.

For the periodic treatments with oxidizing gas once every day or two to convert and reconvert the distributed iodide into active iodine, any of various oxidizing and preferably non-corrosive gases are effective. Examples of such gases that are essentially non-corrosive and at present believed to be of superior effectiveness in the process are ozone, hydroperoxides such as methylcyclohexyl hydroperoxide and tertiaryalkyl hydroperoxides, and ketone peroxides as exemplified by methyl amyl ketone peroxide and methyl ethyl ketone peroxide. Another example of a hydroperoxide (of the category mentioned above) particularly useful in the process is tertiarybutyl hydroperoxide. Further non-corrosive substances which have some utility for the present treatments include alkyl nitrites and also other per compounds, i. e. volatile per compounds such as the volatile peroxides, the latter being represented by di-acetyl peroxide and ditertiary-butyl peroxide. Substances of slightly or mildly corrosive character may be employed in many cases, outstanding compounds of this type being exemplified by the alkyl hypochlorites such as tertiarybutyl hypochlorite.

Even these compounds, however, may be deemed non-corrosive in comparison with substances such as nitrogen peroxide, chlorine, nitrogen trichloride, chlorine dioxide and other oxidizing, chlorinous gases of which further examples are di-chloramine and mono-chloramine. As indicated, a suitable non-corrosive gas is one which does does liberate appreciable quantities of acid or acid salts in the presence of moisture; references herein to corrosion may be taken as meaning damage to or deterioration of metals such as iron, ordinary steel and the like to a very much greater extent than is represented by ordinary rusting, even such rusting as which may occur in the damp atmosphere (say, 85% relative humidity) of a fruit storage house.

It may be noted, nevertheless, that procedure of the character herein described may be effectively performed by a corrosive gas such as those listed above, i. e. employing the gas every day or so to reconvert iodide on the fruit to available form. While one important new advantage of the preferred process (namely, avoidance of injury to exposed metal structures and equipment) is not then realized, other of the advantages are achieved, including (1) greater certainty of fungicidal effect by the continual maintenance of active iodine on the fruit, and (2) much less likelihood of damage to the fruit than in the use of such gases for direct anti-fungus attack. Chemical conversion of iodide to iodine can be achieved more readily and rapidly (by the gas) than a thorough destruction of decay-producing organisms; adequate quantities of active iodine can be built up, throughout the stored fruit, with relatively low concentrations of one of these corrosive gases, and thus in many cases without serious danger of overdosage to the more accessible articles.

A gas such as ozone, however, has special advantages of convenience and practical efficiency. For release in the chamber or shed that houses the articles to be treated, the ozone can be supplied by a suitable ozone generator, of which effective types are known and available. Such generators usually employ the so-called silent electric discharge between two conducting surfaces separated by a dielectric, the space between such surfaces being occupied partly by air (or oxygen) introduced as the source of oxygen for conversion to ozone, and partly by one or more layers of solid dielectric. For instance, the conducting surfaces may be metallic foils in good contact with the outer faces of glass layers between which the air is passed. Upon applying an alternating e. m. f. of suitable high value, say 10,000 volts, across the conductors, a small alternating current flows, due to the silent discharge (usually seen as a purplish glow), and the continuously withdrawn air (or oxygen) is found to contain a useful concentration of ozone. As an instance of the considerable literature on ozone production, reference may be made to: F. E. Hartman, "Recent Progress in the Production of Ozone," Transactions of the American Electrochemical Society, vol. 44, pages 227 to 243 (1923).

When a peroxide, such as tertiarybutyl hydroperoxide or methylcyclohexyl hydroperoxide, is employed to constitute the oxidizing gas, one convenient method of dispersing and distributing such compound is as follows. The liquid peroxide, for instance, is continuously supplied to a vessel through which a stream of air is also continuously passed in a manner suitable for vaporizing and thereby removing a constant amount of the peroxide. In many cases, the directly resulting stream of air and peroxide vapor is much too concentrated for use on the fruit. Hence the stream of air from the peroxide-dispersing means may be further diluted (with pure air) to bring the concentration of peroxide vapor down into a wholly safe and suitable range.

As stated above, a more complete conversion of iodide to iodine and thus a better decay control (or an economy of reagents or reaction time) may often be achieved by employing a catalyst on the surface of the fruit, i. e. a metallic compound of the class described elsewhere herein; the advantages of such catalyst are especially great in the case of the several organic peroxides and per compounds named above, i. e. in the case of oxidizing agents which may tend to effect a less complete conversion of iodide to iodine than more powerful agents such as ozone.

In applying the iodide by soaking (or spraying) with a solution of potassium iodide or the like, rather dilute solutions are usually adequate, for instance, aqueous solutions containing in the neighborhood of 1% or 2% of the salt. Much stronger solutions, e. g. up to 10% or so, can be used without deleterious effect, when circumstances require; for deposition of any selected quantity of the salt on each piece of fruit, the concentration of the solution will in most cases be chosen in accordance with the method used to apply it.

By way of example, lemons were subjected to a dipping and draining treatment substantially the same as the water washing ordinarily used by packers, except that the liquid was a 1% aqueous solution of potassium iodide. After being dried in the air, the lemons were found to have retained from 0.75 mg. to 2 mg. of potassium iodide apiece. Since the average weight of the skin of the lemons was about 38 grams, each thus carried a concentration of about 20 to 50 P. P. M. (parts per million by weight) of the iodide, in the skin. For practice of the present process under most circumstances, this represents a relatively considerable amount of iodine; indeed lesser amounts can sometimes be used. In general, for any given type and time of dipping and draining operation, the quantity of iodide left on the fruit varies in proportion to the concentration of the solution used; if the procedure is changed, a similar proportionality exists but the absolute values of the iodide residue are different. In all cases, and as further evidence of such proportionality, extremely dilute solutions seem relatively much less effective in adding the iodine; for instance, after one treatment of lemons with 0.1% potassium iodide solution, only about 0.08 mg. of the salt was left on each fruit.

When a metal catalyst is used, e. g. very preferably a compound of cobalt (although other compounds such as those of iron and manganese are effective), it is applied by dipping or otherwise treating the fruit in an aqueous solution containing about 1% of the metallic compound either dissolved or suspended. More generally stated, the concentration of the compound can be from 0.5% to 2% or so, or even somewhat outside these limits in some cases (i. e. from a minor fraction of one per cent up to several per cent or more). Although it can be separately applied, the compound is preferably embodied in the same solution that carries the iodide; for instance if the fruit is dipped in an aqueous solution containing 1% potassium iodide and 1% cobaltous sulfate or chloride, and subsequently dried, it has a coating which contains both iodide and catalyst in effective amounts. Insoluble compounds of these metals, such as the hydroxides, may be similarly employed in suspension instead of the soluble salts, but somewhat larger quantities of them are usually necessary, especially to achieve an immediate beneficial effect. On the other hand, they have the special advantage of persisting much longer on the skin of the fruit, by reason of their lower solubility. Nevertheless, even in cases where the catalyst has been applied as a soluble salt, it may remain effective on the surface of the produce for some time after the iodide (gradually depleted by conversion to iodate) has had to be re-replenished at least once by a hydrogen iodide or like treatment.

As an example of the application of iodine by treatment with gaseous hydrogen iodide, one set of tests involved producing an acid-carrying atmosphere by bubbling air through a solution of hydrogen iodide, i. e. containing 50% to 60% of that compound. The effluent air contained about 0.3 mg. of iodide (measured as iodine) per liter. Upon exposing fruit, e. g. lemons, to such an atmosphere for 20 minutes, it was found that about 0.2 mg. of iodide, or thereabouts, accumulated, and hence remained, on each lemon, distributed over its surface. Upon increasing the exposure to as much as 200 minutes, the amount of iodide similarly absorbed in the skin of each lemon (with like uniformity of distribution) was increased to as much as 1.25 mg.

For illustration of the practical, decay-preventing effects, understood to be accomplished by inhibition of the growth of organisms such as fungi, the following example of one series of operations is set forth: A large number of fresh lemons were inoculated with mold spores and then allowed to dry. They were thereafter dipped in a 1% potassium iodide solution for one minute and air dried, such dipping being essentially like the washing treatment which, without the iodide, has been customarily employed with fruit of such character in ordinary cleaning and processing. In these specific tests, which are described below and which involved periodic treatment with ozone as oxidizing agent, no catalyst was used.

A group of 30 of the lemons, inoculated with spores and treated with potassium iodide as above, was placed in a chamber, where they were treated with 2 liters per minute of air containing 0.14 to 0.18 mg. per liter of ozone, such treatment being continued for about 4 hours. The ozone was derived from an ozone generator of conventional character, e. g. as described hereinabove. The stated treatment with ozone was performed 3 times each week during the entire period in which the lemons were kept in storage. A like group of lemons, which had also been inoculated with mold spores, were established in another chamber as an untreated control, i. e. receiving neither iodide nor ozone treatment. A still further group of the lemons, likewise inoculated with the mold spores, received no iodide treatment but was simply dipped in plain water and air dried. This group received the same ozone treatment (but in a separate vessel) as the iodide-treated batch.

The three groups of lemons, at least when not being treated in any way, were held at a temperature of 8° to 10° C., sealed up in containers which prohibited dehydration. The treatment or simple storage of the several groups was continued for many days, observation of the condition of each group being made every day. At the end of the third week of storage, the control, i. e. wholly untreated group, began to decay quite appreciably and at the end of 37 days showed as much as 20% decay. Practically similar results were obtained in the case of the group treated with ozone alone, i. e. where no iodine was supplied to the surface of the articles; decay showed up rapidly and had assumed serious proportions by the end of the stated interval.

The group which had been dipped in the iodide solution and which was subjected to the regular treatments with ozone (pursuant to the present process), i. e. 3 times a week, showed no signs of decay at the end of 37 days. After this time, however, some signs of mold or decay began to appear on this group, indicating that the iodide or iodine carried by the surface (i. e. the skin) of the fruit was substantially exhausted. Other tests have indicated, however, that if replenishment of the iodide content had been effected at about the 30th day, continued preservation or protection of the fruit would have been achieved by the process for a like further interval, and indeed essentially indefinitely so long as the iodine concentration was appropriately restored from time to time.

It will be seen that the present procedure affords a convenient, safe and relatively inexpensive operation for protecting natural, grown products from decay, specifically by inhibiting growth of organisms, and that disadvantages of prior procedures are essentially avoided. Indeed the described tests clearly demonstrate that despite the ineffectiveness of ozone or the like when used alone, the stated series of operations function satisfactorily to keep a content of active iodine on the fruit, and thus prevent decay which would otherwise have been produced. While it has been noted above that similar re-conversion of iodide to free iodine on the surface of the fruit may, as a matter of chemical reaction, and with certain new and useful results, be produced by using (in the novel periodic treatment) other oxidizing gases such as nitrogen peroxide, chlorine and chlorine dioxide that have corrosive properties, the new and paramount advantage of avoiding injury to structures and equipment with which the treating gas may come in contact, can only be achieved by following the further or specific feature of discovery mentioned above, namely, the regular, recurring application, to the iodine-carrying articles, of a non-corrosive, oxidizing gas.

It is to be understood that the invention is not limited to the specific procedures hereinabove set forth but may be carried out in other ways without departure from its spirit.

We claim:

1. In procedure for treating natural, grown products of vegetable origin to inhibit deterioration thereof, the steps of establishing on the product a distributed quantity of iodide, and treating said product with a non-corrosive, oxidizing gas for reaction with said iodide to release iodine in available form, on the product, said oxidizing gas being applied from a source external to the product.

2. In procedure for inhibiting growth of organisms on the surface of an article consisting of a natural grown product of vegetable orgin, the steps of establishing, on said surface of the article, iodine in available form and in a distributed concentration effective to remove contaminating organisms by reaction therewith, said iodine being converted at least in part to iodide form by said reaction with contaminating organisms, and re-establishing iodine in available form and effective, distributed concentration, by treating the article with non-corrosive, oxidizing gas for reaction with said iodide to release available iodine therefrom, on the surface of the article.

3. A process for treating natural, grown products of vegetable origin to inhibit deterioration thereof which may arise from repeated occurrences of contaminating influences on the product from time to time over a prolonged period, comprising applying to the surface of said product a quantity of iodine, in iodide form, treating the iodide-carrying product with non-corrosive, oxidizing gas for reaction with at least a part of said iodide to convert the same to iodine in available form, said available iodine being active to remove contaminating influences and being thereby reduced to iodide form, and treating the product with successive further amounts of non-corrosive, oxidizing gas for reconversion of said iodide, at least in substantial part, to the available form, substantially as necessary, and applying successive further quantities of iodide to the surface of the product to replace losses occurring throughout successive treatments with oxidizing gas, said gas treatment and iodide-applying steps being cooperatively controlled to maintain an effective concentration of available iodine on the surface of the product substantially throughout the aforesaid period.

4. In procedure for inhibiting growth of organisms on the surface of an article consisting of a natural grown product of vegetable origin, the steps of establishing on the article a distributed quantity of iodine in available form, said iodine being converted at least in part to iodide form by reaction with contaminating organisms, and repeatedly reestablishing iodine in available form on the article by repeatedly treating the article with oxidizing gas for reaction with the aforesaid iodide to release iodine in available form, on the product.

5. In procedure for treating natural, grown products of vegetable origin to inhibit deterioration thereof, the steps of establishing on the product a distributed concentration of iodide, and treating the iodide-carrying product with ozone for reaction with said iodide to release iodine in available form, on the product.

6. In procedure for treating natural, grown products of vegetable origin to inhibit deterioration thereof, the steps of treating the product with a dilute gaseous mixture containing hydrogen iodide for establishing on the surface of the product a distributed quantity of iodide, and treating the iodide-carrying product with non-corrosive, oxidizing gas for reaction with the iodide to release iodine in available form, on the product.

7. In procedure for inhibiting growth of organisms on the surface of an article consisting of a natural grown product of vegetable origin, the steps of establishing a quantity of iodine in distributed form over said surface of the article, and treating said article with an oxidizing gas for reaction with said iodide to release iodine in available form on the surface of the article, said oxidizing gas being applied from a source external to the article.

8. A process as described in claim 7 which includes applying to the surface of the article prior to the gas treatment, catalyst material selected from the class consisting of cobalt, iron and manganese compounds, to promote the aforesaid reaction of the gas with the iodide.

9. In procedure for treating natural, grown products of vegetable origin to inhibit deterioration thereof, the steps of establishing on the product a distributed concentration of iodide, and treating the iodide-carrying product with a non-corrosive, organic, oxidizing gas for reaction with said iodide to release iodine in available form, on the product, said oxidizing gas being applied from a source external to the product, and said procedure including applying to the surface of the article prior to the gas treatment, catalyst material selected from the class consisting of cobalt, iron and manganese compounds, to promote the aforesaid reaction of the gas with the iodide.

10. A process as described in claim 9, wherein the steps of establishing the iodide on the product and of applying the catalyst thereto are performed by treating the product with an aqueous solution of an iodide, containing also a cobalt compound.

11. A procedure for treating natural, grown products of vegetable origin to inhibit growth of organisms thereon, said products being adapted to have successively arising growths of organisms thereon from time to time over a prolonged period, comprising establishing on the surface of the product a distributed concentration of iodine in available form, effective to react with organisms, said available iodine being converted to iodide upon reaction with contaminating organisms, and repeatedly treating the product with a non-corrosive, oxidizing gas for reconverting, repeatedly as necessary, said iodide to available form, to maintain an effective concentration of said iodine in available form on the surfaec of the product, substantially throughout said period.

12. A process as described in claim 11, wherein the concentration of the available iodine is first established on the product by applying to the surface thereof a distributed quantity of iodide and treating the product with said non-corrosive, oxidizing gas for reaction with said last-mentioned iodide to release iodine in available form.

13. A process as described in claim 11, which includes supplying further iodine to the surface of the product after a series of the aforesaid treatments with oxidizing gas, to replenish the iodine content on the surface of the product with respect to losses occurring during said series of gas treatments, said further iodine being supplied by treating the product with a gas containing an iodide constituent adapted to be absorbed by the surface of the product.

14. A process as described in claim 13, wherein the gas comprises air containing hydrogen iodide in dilute gaseous form as said iodide constituent.

References Cited in the file of this patent

UNITED STATES PATENTS

| | | |
|---|---|---|
| 2,084,956 | Hessel | June 22, 1937 |
| 2,193,636 | Marshall | Mar. 12, 1940 |

OTHER REFERENCES

"A Comprehensive Treatise on Inorganic and Theoretical Chemistry," volume II, 1922, by J. W. Mellor, published by Longmans, Green and Co., 55 Fifth Avenue, New York, page 41, article entitled "The Preparation of Iodine."

"A Study of the Darkening of Apple Tissue," by Overholser et al., Technical Paper No. 7, June 1923, page 4.

"Science," February 28, 1947, page 232.